US007904571B1

(12) United States Patent
Kalmanek, Jr. et al.

(10) Patent No.: US 7,904,571 B1
(45) Date of Patent: Mar. 8, 2011

(54) METHOD AND APPARATUS FOR GENERATING A SET OF AGGREGATES

(75) Inventors: Charles R. Kalmanek, Jr., Short Hill, NJ (US); Guangzhi Li, Kearny, NJ (US); Aman M. Shaikh, Summit, NJ (US); Jennifer M. Yates, Morristown, NJ (US); Dongmei Wang, Kearny, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 766 days.

(21) Appl. No.: 11/444,034

(22) Filed: May 31, 2006

(51) Int. Cl.
*G06F 15/16* (2006.01)
(52) U.S. Cl. .......... 709/229; 709/230; 709/238; 709/242
(58) Field of Classification Search .......... 709/227–230, 709/238–242; 370/237, 238, 238.1
See application file for complete search history.

(56) References Cited

U.S. PATENT DOCUMENTS

| 7,082,473 | B2 * | 7/2006 | Breitbart et al. | 709/238 |
| 7,155,534 | B1 * | 12/2006 | Meseck et al. | 709/238 |
| 7,257,086 | B2 * | 8/2007 | Brown et al. | 370/242 |
| 7,257,643 | B2 * | 8/2007 | Mathew et al. | 709/238 |
| 7,298,704 | B2 * | 11/2007 | Kodialam et al. | 370/238 |
| 7,362,727 | B1 * | 4/2008 | O'Neill et al. | 709/239 |
| 7,401,012 | B1 * | 7/2008 | Bonebakker et al. | 709/238 |
| 7,487,256 | B2 * | 2/2009 | Kim et al. | 709/238 |
| 7,519,714 | B2 * | 4/2009 | Macneil | 709/227 |
| 2007/0165532 | A1 * | 7/2007 | Retana et al. | 370/241 |

* cited by examiner

*Primary Examiner* — Bharat N Barot

(57) ABSTRACT

A method and apparatus for generating at least one aggregate (e.g., a set of aggregates) for a given area of a network such that the number of aggregates is minimized subject to a maximum acceptable path selection error are disclosed. One operational benefit of the present method is that network administrators can select aggregates for an area based solely on the topology of the area without worrying about remaining areas of the OSPF network. Another benefit is that the present method enables trade-offs between the number of aggregates and the bound on the path selection error.

18 Claims, 5 Drawing Sheets

US 7,904,571 B1

METHOD AND APPARATUS FOR GENERATING A SET OF AGGREGATES

The present invention relates generally to communication networks and, more particularly, to a method and apparatus for generating a minimum number of aggregates subject to a maximum allowed path selection error.

BACKGROUND OF THE INVENTION

Multiple addresses within an Open Shortest Path First (OSPF) area can be aggregated and advertised together to other areas. This process is known as address aggregation and is used to reduce router computational overheads and memory requirements and to reduce the network bandwidth consumed by OSPF messages. However, the downside of address aggregation is that it leads to information loss and consequently sub-optimal (non-shortest path) routing of data packets. The resulting difference (path selection error) between the length of the actual forwarding path and the shortest path varies between different sources and destinations.

Therefore, there is a need for a method and apparatus that generate the minimum number of aggregates subject to a maximum allowed path selection error.

SUMMARY OF THE INVENTION

In one embodiment, the present invention discloses a method and apparatus for generating at least one aggregate (e.g., a set of aggregates) for a given area of a network such that the number of aggregates is minimized subject to a maximum acceptable path selection error. In one embodiment, the path selection error or path error bound is selected in accordance with the requirement of a particular application.

One operational benefit of the present method is that network administrators can select aggregates for an area based solely on the topology of the area without worrying about remaining areas of the OSPF network. Another benefit is that the present method enables trade-offs between the number of aggregates and the bound on the path selection error.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Open Shortest Path First (OSPF) is a widely used intra-domain routing protocol in IP, MPLS and optical networks. OSPF is conceptually a link-state routing protocol. In link-state routing protocols, every router acquires a complete view of the network topology. Each link has an associated weight that is administratively assigned. Using the weighted topology, each router computes a shortest path tree with itself as the root, and applies the results to build its forwarding table. This assures that packets are forwarded along the shortest paths defined by the link weights to their destinations.

Figure 1:
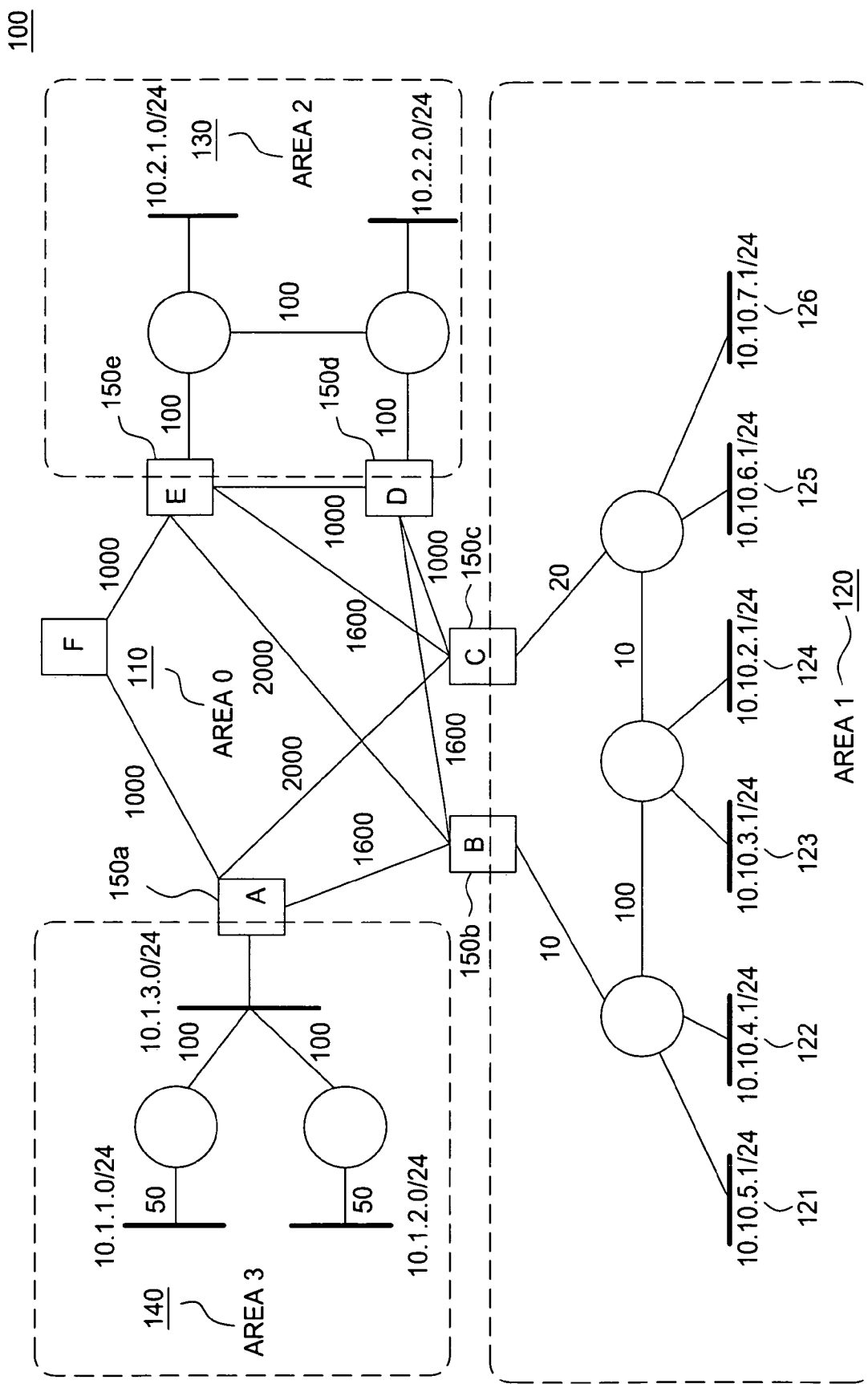
FIG. 1 illustrates an exemplary Open Shortest Path First (OSPF) network related to the present invention.

For scalability, OSPF allows the network to be divided into areas to define a two-level hierarchy. FIG. 1 illustrates an exemplary Open Shortest Path First (OSPF) network 100 related to the present invention. The network 100 can be any type of networks, e.g., an optical network, an Internet Protocol (IP) network such as a Voice over Internet Protocol (VoIP) network or a Service over Internet Protocol (SoIP) network and the like. For example, Area 0 (110), known as the "backbone area", resides at the top level of the hierarchy and provides connectivity to the non-backbone (non-zero) areas 120, 130, and 140.

Although FIG. 1 only shows an OSPF network with four areas, the present invention is not so limited. Namely, the network can be segregated into any number of areas. In OSPF, each link and subnet are assigned to exactly one area. The routers that have links to multiple areas are called "border routers" 150a-e. For example, routers A, B, C, D and E are border routers in FIG. 1. Every router maintains a separate copy of the topology graph for each area it is connected to. In general, a router does not learn the entire topology of remote areas (i.e., the areas in which the router is not directly connected with), but instead learns the weight of the shortest paths from one or more border routers to each subnet in the remote areas.

For example, router A in FIG. 1 would learn the entire topology of its attached areas 0 and 3. However, it would only learn distances of various subnets of area 1 from border routers B and C, and of area 2 from border routers D and E. This summarization of information outside an area reduces the CPU and memory consumption at routers as well as the network bandwidth consumed by OSPF messages. This makes the protocol more scalable.

OSPF allows border routers to further aggregate a set of subnet addresses into a less specific prefix and advertise a distance to this aggregate prefix instead of distances to the individual subnets. This is referred to as "address aggregation". Typically, the distance assigned to an aggregate is the maximum of the distance to any subnet covered by the aggregate. Aggregation of subnet addresses into less specific prefixes is controlled by configuration on the border routers.

As an example, consider area 1 120 in FIG. 1. Suppose a single aggregate 10.10.0.0/21 is used to represent all of the subnets in the area. In that case, router (B) will advertise a distance of max(10, 110, 120)=120 to 10.10.0.0/21, and router (C) will advertise a distance of max(20, 30, 130)=130 to 10.10.0.0/21.

Address aggregation further reduces resource consumption at the routers outside a given area. However, address aggregation generally leads to information loss, which may result in sub-optimal forwarding as the selected path may not be the shortest path to the destination. To illustrate, when a single aggregate 10.10.0.0/21 is used for representing all subnets (121-126) in area 1, router (A) 150a routes all packets via border router (B) 150b to all destinations in area 1, while routers (D) 150d and (E) 150e route all packets via border router (C) 150c for destinations in area 1. These routing decisions are clearly not optimal (i.e., minimum distance). If the routing information in area 1 had not been aggregated, router (A) 150a, for example, would have routed packets via router (B) 150b if destined for 10.10.5.1/24 and 10.10.4.1/24, and via router (C) 150c if destined for 10.10.3.1/24, 10.10.2.1/24, 10.10.6.1/24 and 10.10.7.1/24. Thus, the aggregation of subnet addresses leads to cases where traffic is not forwarded along the shortest path.

For a given source-destination pair, the present invention defines the difference between the length of the selected path and the length of the shortest path to be the "path selection error". It is of interest to network architects and administrators to know the path selection error introduced by aggregation, and to minimize it.

The present invention discloses a method and apparatus for generating a set of aggregates for a given area such that the number of aggregates is minimized subject to a maximum acceptable path selection error. One aspect of the present invention is that it is premised on the fact that the path selection error from any source to any destination can be bounded by a value that depends only on the parameters describing the destination area.

The present disclosure will describe a theorem that will prove this premise. More specifically, the theorem proves that the bound on the path selection error can be determined based on three components: the set of border routers in the area, the set of subnets and their distances from the border routers, and the set of aggregates and their distances from the border routers. Using the theorem as a basis, the present invention discloses a method that generates a set of aggregates for a given area such that the number of aggregates is minimized subject to a maximum acceptable path selection error. Since the method uses only information about the area of interest, a change to the topology or weights of the area requires a recalculation of aggregates for that area only; not all the areas. For large ISP and enterprise networks, this offers a tremendous advantage in terms of network scalability, planning and operations. Another advantage of the method is that it enables a trade-off between the number of aggregates and the bound on the path selection error. The method also opens up the possibility of an on-line implementation where a central server or routers themselves can run the method and adjust aggregates dynamically as the network topology evolves.

The following notations will be used in the present disclosure:

s, t Subnets
$D_s(s, t)$ Shortest path distance from source s to subnet t
X, Y Aggregates
$D_a(s, t, X)$ Actual distance from s to t on path selected due to X
E(s, t, X) Error in path selection due to the aggregate X, which is $D_a(s, t, X)-D_s(s, t)$
K Bound on maximum acceptable path selection error
$X^F$ set of subnets covered by the aggregate X in the area
$X_s$ Subset of $X^F$
$F(R_i, X)$ Longest distance from $R_i$ to subnets covered by X, which is $\max_{s \in X^F} D_s(R_i, S)$
B Number of border routers $(R_1, R, \ldots, R_B)$ in an area
N Number of subnets $(t_1, t_1, \ldots t_n)$ in an area
$D_{min}$ Minimum distance between all (border router, subnet) pairs, which is $\min_{1 \leq i \leq B, 1 \leq j \leq N} D_s(R_i, t_j)$
$D_{max}$ Maximum distance between all (border router, subnet) pairs, which is $\max_{1 \leq i \leq B, 1 \leq j \leq N} D_s(R_i, t_j)$
$D_r$ Distance range, which is $D_{max}-D_{min}$
A/M Prefix for a subnet or an aggregate. A is the IP address and M is the mask length.

To better understand the present invention, the present disclosure formulates the problem underlying the present novel aggregate selection algorithm or method. The present disclosure uses s and t to denote subnets of an OSPF area, and X and Y to denote the aggregates. Whenever required, addresses of subnets and aggregates are represented as A/M where A represents the IP address, and M represents the mask length. Let $D_s(s,t)$ be the shortest path length from a source s to a destination t. The present disclosure denotes the metric assigned to an aggregate X by a border router R as F(R,X). Furthermore, the present disclosure denotes the length of the selected path from s to t when aggregate X is used to represent t as $D_a(s,t,X)$. Since $D_s(s,t)$ is the length of the shortest path between s and t, $D_a(s,t,X) \geq D_s(s,t)$. The present disclosure denotes the path selection error from s to t due to X as E(s,t,X). Since the path selection error is equal to the difference between the selected path length and the shortest path length, $E(s,t,X)=D_a(s,t,X)-D_s(s,t)$.

The present disclosure formulates the aggregate selection problem as follows: given an acceptable path selection error, K, a set S of N subnets, a set of B border routers and a B×N matrix representing distances between each (border router, subnet) pair, the objective is to identify a set of aggregates such that the number of aggregates is minimized and the path selection error E(s,t,X) from a source s to any subnet t∈S is bounded by K, i.e., $E(s,t,X) \leq K$, where t is covered by the aggregate X.

Figure 2:
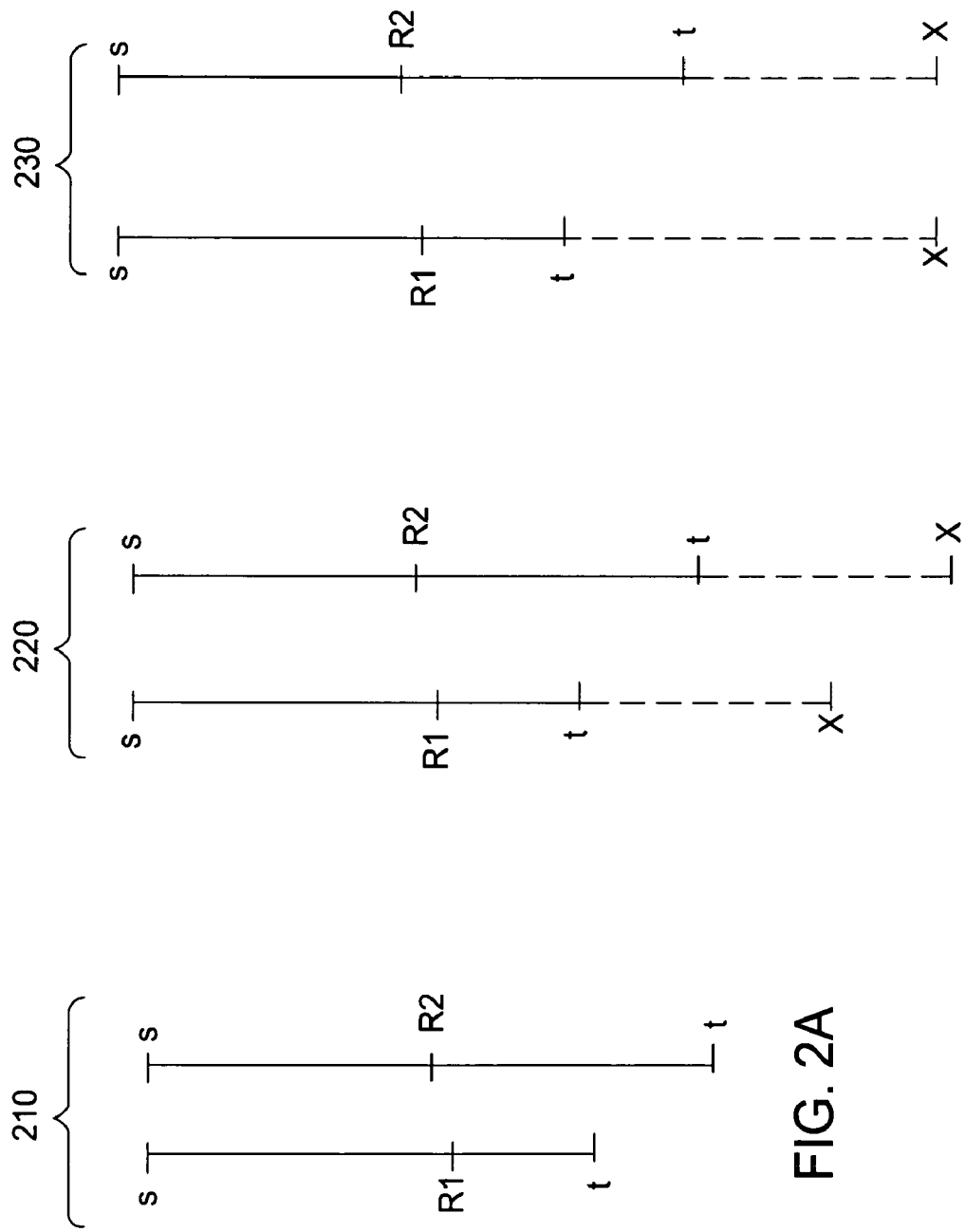
FIG. 2 illustrates an example showing how path selection error can be bounded.

The present disclosure proves that an upper bound on the path selection error can be calculated using only local topology information. The present disclosure starts with an example. Suppose an example has two border routers $R_1$ and $R_2$, and a subnet t in an area. The present disclosure assumes that s is a source outside the area. FIG. 2 represents the shortest path from s to t via $R_1$ and $R_2$ as strings with length proportional to the distance of the paths from s. As is evident from FIG. 2(a) 210, s will pick the path via $R_1$ to reach t when no aggregation is used. Now suppose an aggregate X is used to represent t. In this case, whether s selects the path via $R_1$ or $R_2$ to reach t, depends on the advertised distances from $R_1$ and $R_2$ to X. Since it is likely that both $R_1$ and $R_2$ will advertise a distance to X that is no less than the advertised distance to t, the paths to X are shown as stretched strings in FIG. 2(b) 220 and FIG. 2(c) 230. If both strings stretch by the same amount as shown in FIG. 2(b), s will still pick $R_1$ to reach t as shown. In this case, the path selection error is zero. In fact, even if the stretch amount for $R_1$ is larger than that for $R_2$, s will still choose $R_1$ so long as the difference between the stretch amounts for two border routers is less than the difference in the lengths of two strings in FIG. 2(a). Only when the difference between the stretch amounts increases beyond that will s pick $R_2$ to reach t, and the error in path selection is introduced. Note that the path selection error, which is the difference between the two strings in FIG. 2(a), cannot be more than the difference in the stretch amounts of the two strings. In other words, the error in path selection is always bounded by the difference in stretch amounts. Since the stretch amounts of the strings can be determined using parameters of the subnet t's area only, the path selection error can be bounded using the destination area's parameters only. Theorem 1 formalizes this observation below.

Theorem 1: Let us assume that the given area A has B border routers $(R_1 \ldots, R_B)$ and X is one of the aggregates used to cover one or more subnets in area A. Let $F(R_i,X)$ be the metric assigned to aggregate X by $R_i$. Let t be one of the subnets in A covered by X. Furthermore, let s be a source outside area A. The path selection error from source s to destination t covered by X is bounded by $E(s,t,X) \leq \max_{1 \leq i,j \leq B}|(D_s(R_i,t)-F(R_i,X))-(D_s(R_j,t)-F(R_j,X))|$.

Proof: The present disclosure assumes that the shortest path length from s to t via border router $R_i$ is $d_i(1 \leq i \leq B)$ where $$=D_i=D_s(s,R_i)+D_s(R_i,t)$$

Furthermore, the present disclosure assumes that the advertised path length from s to t via $R_i$ due to aggregate X is $c_i (1 \leq i \leq B)$ where $$c_i = D_s(s, R_i) + F(R_i, X)$$

Let $d_k$ represent the shortest path distance from s to t.

However, since t is covered by the aggregate X, the selected path would be the one with the shortest advertised path length which is denoted by $c_j$. Thus, $c_j \leq c_k$ which is $$D_s(s, R_j) + F(R_j, X) \leq D_s(s, R_k) + F(R_k, X)$$

$$D_s(s, R_j) - D_s(s, R_k) \leq F(R_k, X) - F(R_j, X)$$

Since the shortest path from s to t is the one passing through router $R_k$ with a distance of $d_k$, and the selected path is the one passing through router $R_j$ with a distance of $d_j$, the path selection error E(s,t,X) is:

$$\begin{aligned}
&= d_j - d_k \\
&= D_s(s, R_j) + D_s(R_j, t) - D_s(s, R_k) - D_s(R_k, t) \\
&= D_s(s, R_j) - D_s(s, R_k) + D_s(R_j, t) - D_s(R_k, t) \\
&\leq F(R_k, X) - F(R_j, X) + D_s(R_j, t) - D_s(R_k, t) \\
&= (F(R_k, X) - D_s(R_k, t)) - (F(R_j, X) - D_s(R_j, t)) \\
&\leq \max_{1 \leq i,j \leq B} |(D_s(R_i, t) - F(R_i, X)) - (D_s(R_j, t) - F(R_j, X))|
\end{aligned}$$

Note that the theorem holds true for an arbitrary cost assignment function F(R,X) as long as all the border routers use the same function. This theorem is used as a basis to the present aggregation method.

The present invention presents a method that determines a set of aggregates that minimizes the number of aggregates required to cover all of the subnets within an area subject to a given bound on path selection error. The method comprises of two main steps:
1. Determine a set of candidate aggregates from which aggregates to be advertised by border routers can be selected.
2. Select a set of aggregates out of the candidate aggregates subject to the error bound.

The present invention follows the following assumptions:
1. Subnet addresses in one area do not overlap with those in other areas. This is a reasonable assumption, as network architects typically assign addresses in this manner.
2. The candidate aggregates in one area do not overlap with subnet addresses or candidate aggregates in other areas.

Figure 4:
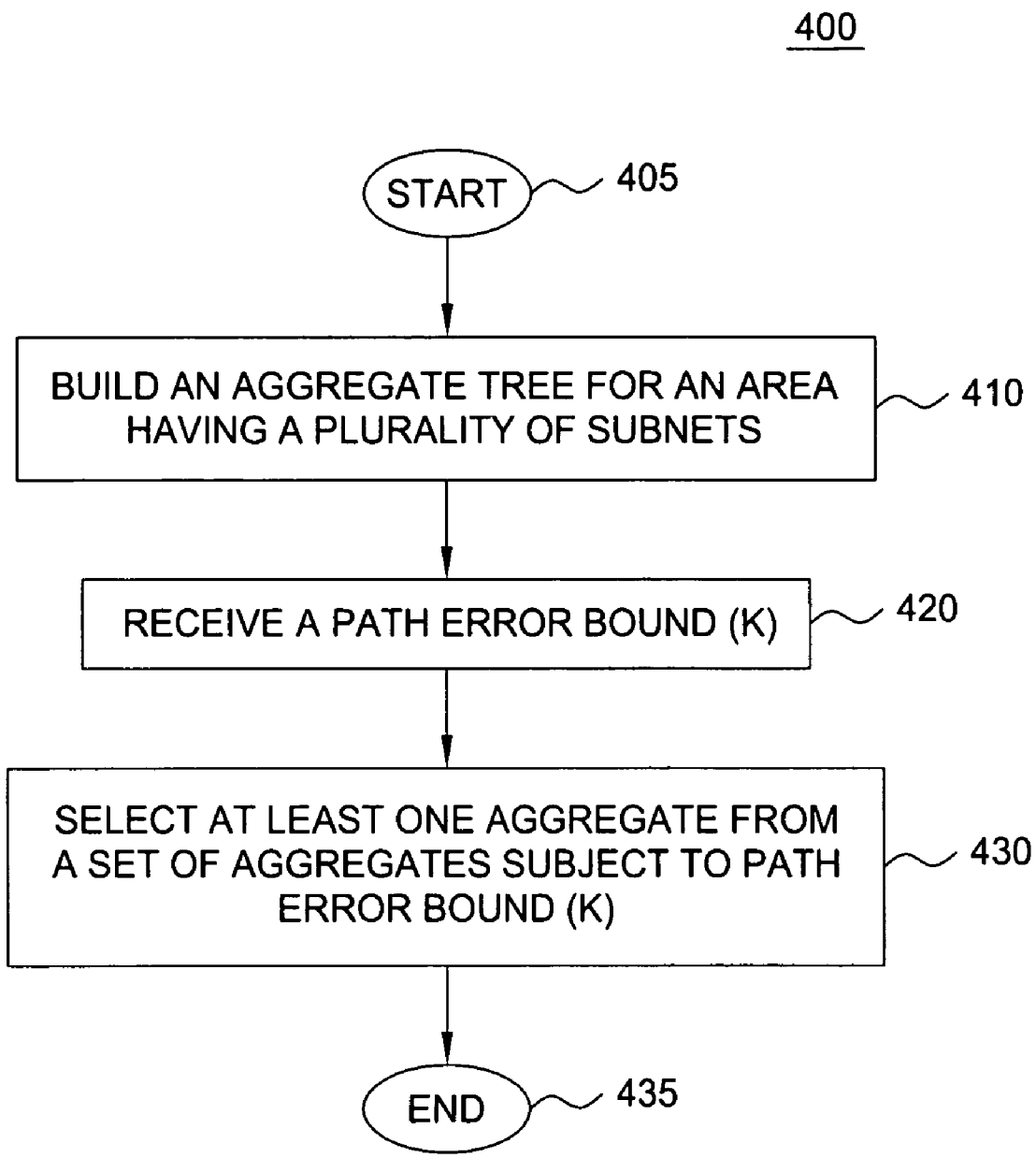
FIG. 4 illustrates a flowchart of a method for generating a set of aggregates.

FIG. 4 illustrates a flowchart of a method 400 for generating a set of aggregates. Method 400 starts in step 405 and proceeds to step 410.

Figure 3:
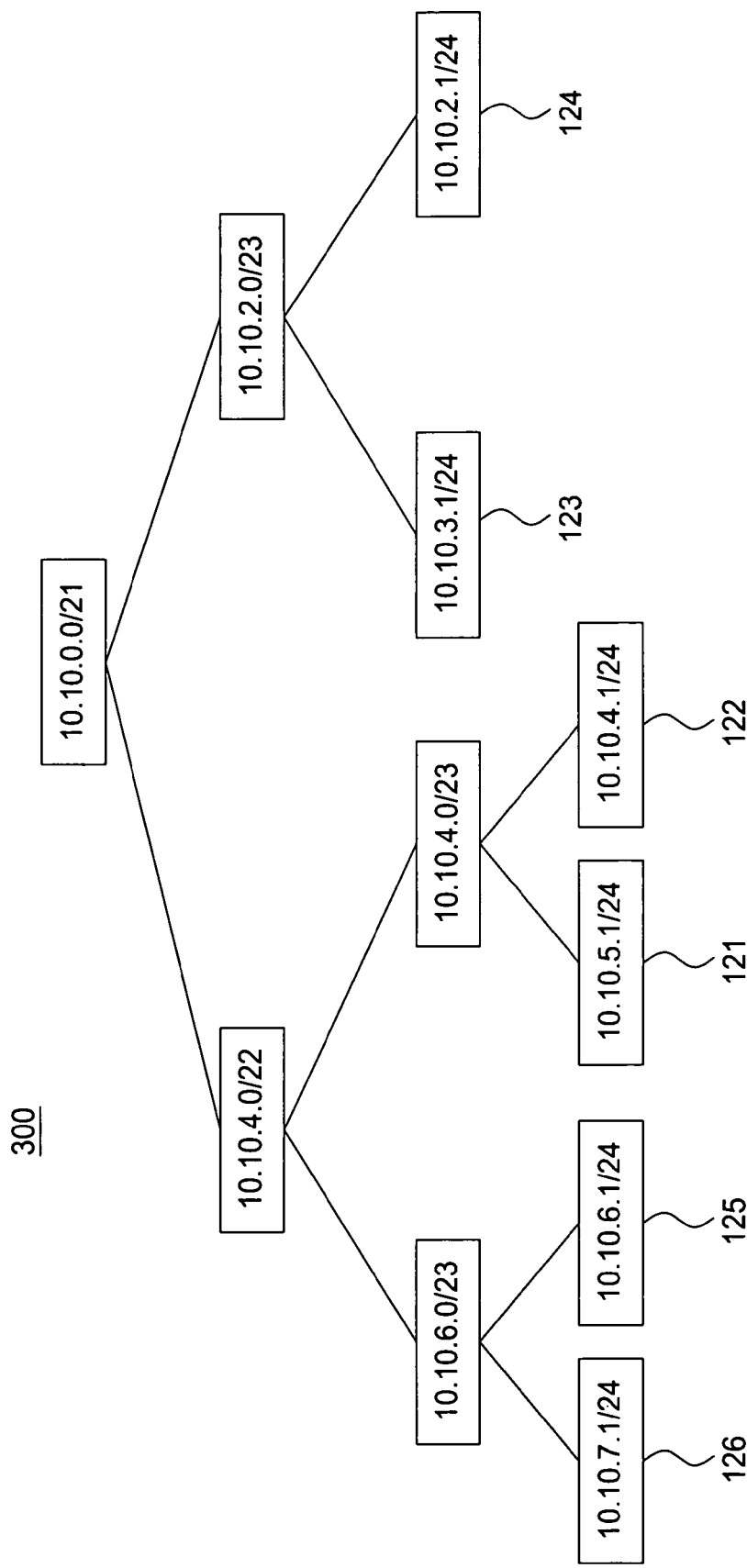
FIG. 3 illustrates an exemplary aggregate tree.

In step 410, method 400 builds an aggregate tree for an area of a network having a plurality of subnets. In one embodiment, to determine the set of candidate aggregates, the concept of an "aggregate tree" is used. In one embodiment, an aggregate tree is a binary tree in which each node represents an IP prefix, A/M. Each edge of the tree represents containment relationship between prefixes, i.e., the prefix of the parent node always covers all of the addresses represented by the prefixes of its two children. The present method builds the aggregate tree such that the subnet addresses of an area form the leaves of the tree. Each internal node of the tree represents a candidate aggregate that can be used for representing all of the subnets in its subtree. FIG. 3 shows the aggregate tree 300 for the subnets of area 1 in FIG. 1.

In one embodiment, method 400 builds an aggregate tree by starting with an empty tree, and adds one subnet to the tree at a time. At any given time, the partially constructed tree contains candidate aggregates that covers all subnets added to the tree up to that point. For example, the first subnet added to the tree becomes its root. To add each subsequent subnet to the tree, the method starts at the root of the tree. If the root covers the new subnet, the method examines the children of the root. If one of the children covers the subnet, the method further examines the children of this node, and so on until it locates a node P in the tree whose children do not cover the new subnet. Once such a node is located, the method performs a longest prefix match of the subnet with the two children of P. In one embodiment, the present method denotes the selected child as H. The method removes the edge between H and its parent, P, and creates two new nodes. The first node represents the new subnet address and is denoted as H1. The other node represents the most specific prefix that contains both H and H1 and is denoted as H2. H2 is then inserted as a child of P, while H and H1 become the children of H2.

Procedure 1 (shown below) presents the illustrative pseudo-code of AggrTree which implements the above mentioned tree construction method. In one embodiment, the procedure takes a set of subnet addresses $\{A_i/M_i | 1 \leq i \leq N\}$, and constructs the aggregate tree T. The procedure uses r to represent the root of T. The first prefix, $A_1/M_1$, initializes the tree by becoming the root. For each subsequent prefix, the procedure tries to determine whether the prefix should be added to the subtree rooted at root r or whether a new root needs to be created. The function Compare (X/m, $A_i/M_i$) determines the most specific prefix Y/k which covers both X/m and $A_i/M_i$.

Procedure 2 (shown below) presents the illustrative pseudo-code of Compare (X/m, $A_i/M_i$). Coming back to AggrTree, if k is equal to m, root r covers $A_i/M_i$, and the procedure calls AddChild (X/m, $A_i/M_i$ to add $A_i/M_i$ at an appropriate place in the subtree rooted at r. Otherwise, Y/k is made the new root of the tree, and X/m and $A_i/M_i$ are made children of this newly created root.

Procedure 3 (shown below) presents the illustrative pseudo-code of AddChild (X/m, $A_i/M_i$) which calls itself recursively to add the new subnet $A_i/M_i$ as a node in the subtree rooted at X/m. Suppose that $H_1/h_1$ and $H_2/h_2$ are two children of X/m, and $T_1$ and $T_2$ are the subtrees rooted at these children respectively. The procedure first tries to determine which $T_i$ the subnet $A_i/M_i$ should go in. In order to do so, the procedure calls Compare to determine the most specific prefixes $Y_1/k_1$ and $Y_2/k_2$ that covers $A_i/M_i$ and the two children $H_1/h_1$ and $H_2/h_2$ respectively. The procedure then picks that subtree $T_i$ for which $Y_i/k_i$ turns out to be more specific. Once the procedure has picked the appropriate subtree, there are two possible cases regarding how $A_i/M_i$ is added to the subtree. In the first case, the root of $T_i$ ($H_i/h_i$) covers $A_i/M_i$. Under this case, the procedure calls itself with the appropriate child ($H_i/h_i$) as the root. In the other case, $Y_i/k_i$ is made the new root of $T_i$, and $H_i/h_i$ and $A_i/M_i$ become two children of $Y_i/k_i$.

```
Procedure 1 AggrTree (N , {A_i / M_i |1 ≤ i ≤ N})
    r ← ∅
    for i = 1, . . . , N do
        if r = ∅ then
            create node A_i/M_i and r = A_i/M_i
        else
            X / m ← r
            Y / k ← Compare(X / M , A_i / M_i)
            if k = m then
```

-continued

```
        AddChild(X / m, A_i / M_i)
    else
        create nodes Y / k and A_i / M_i
        create an edge between Y / k and X / m
        create an edge between Y / k and A_i / M_i
        r ← Y / k
    end if
  end if
 end for
 return r
Procedure 2 Compare(A_1 / M_1, A_2 / M_2 )
 Y ← A_1 & A_2, where & is the bit 'and' operator
 M ← min(M_1, M_2 )
 Let k denote the maximum number of equal bits of A_1
  and A_2 form left to right among the first M bits
 return Y / k
Procedure 3 AddChild(X/m, A_i/M_i)
H_1/h_1 and H_2/h_2 are two children of X/m
Y_1/k_1←Compare (H_1/h_1, A_i/M_i)
Y_2/k_2←Compare (H_2/h_2, A_i/M_i)
if k_1 > k_2 then
  if k_1=h_1 then
    AddChild(H_1/h_1, A_i/M_i)
  else
    create two node Y_1/k_1 and A_i/M_i,
    delete the edge between X/m and H_1/h_1
    create an edge between X/m and Y_1/k_1
    create an edge between Y_1/k_1 and H_1/h_1
    create an edge between Y_1/k_1 and A_i/M_i
  end if
end if
if k_2 > k_1 then
  if k_2 = h_2 then
    AddChild(H_2/h_2, A_i/M_i)
  else
    create two node Y_2/k_2 and A_i/M_i,
    delete the edge between X/m and H_2/h_2
    create an edge between X/m and Y_2/k_2
    create an edge between Y_2/k_2 and H_2/h_2
    create an edge between Y_2/k_2 and A_i/M_i
  end if
end if
return X/m
```

Returning to FIG. 4, in step 420 method 400 receives a path selection error bound (K) as an input. For example, a network administrator may select a particular path selection error bound (K) in accordance with a performance parameter, e.g., within a particular performance tolerance or threshold. Thus, the path selection error bound (K) is application specific and can be selected in accordance with the requirements of a particular application.

In step 430, method 400 selects at least one aggregate from a set of aggregates subject to the path error bound (K). For example, the aggregate selection method 400 takes an aggregate tree and the acceptable path selection error bound (K) as the input and selects a minimum number of aggregates from the tree such that all of the subnets (i.e., leaves of the tree) are covered and the error bound (K) is satisfied. In one embodiment, for efficiency, the method uses a binary search on the number of aggregates, $N_a$. During the search, for each value of $N_a$ the method searches the tree to determine whether there is a set of $N_a$ (or $<N_a$) aggregates that satisfies the error bound. The method terminates when the lowest value of $N_a$ is identified.

In one embodiment, for a given value of $N_a$, the method traverses the aggregate tree recursively. It begins at the root of the aggregate tree, with the aim of selecting up to $N_a$ aggregates out of the tree. The method has to consider two options. The first option is to select the root as a candidate aggregate, and try to select up to $N_a-1$ aggregates from the two subtrees rooted at the children of the root. The other option is to exclude the root from consideration, and select up to $N_a$ aggregates from the two subtrees. The present disclosure denotes $N_a'$ the number of aggregates that the method has to select from the two subtrees. The method recursively looks for up to $N_{al}$ ($\leq N_a'$) aggregates from the left subtree, and up to $N_a'-N_{al}$ aggregates from the right subtree. The value of $N_{al}$ is varied from 0 through to $N_a'$. For each selected candidate aggregate set, the method calculates the error bound, and compares it with K. The method terminates either when it has identified up to $N_a$ aggregates that satisfy K or when it has failed to identify $N_a$ aggregates by exhausting all possibilities. In one embodiment, the method is implemented as a dynamic program so that it solves each subtree problem only once and saves the results to avoid redundant re-computations.

Procedure 4 (shown below) presents the illustrative pseudo-code for FindAggr (X, Y, $N_a$, K, A(X)) for a given value of $N_a$. In one embodiment, the procedure tries to determine up to $N_a$ aggregates from the (sub)tree rooted at the aggregate X. Y denotes the most specific aggregate among those selected so far that covers X. Y can be Ø and if Y is Ø, the procedure has to make sure that the selected aggregates cover all of the subnets (i.e., leaves) of the subtree. On the other hand, if Y is not Ø, the selected aggregates do not have to cover all the subnets since Y represents the aggregate selected higher up the tree, and can cover all the subnets that are not covered by the aggregates selected here. If the aggregates satisfying K are found, the procedure stores them in the set A(X), and returns true; otherwise it returns false with A(X) set to Ø.

The FindAggr procedure is described in greater detail. In one embodiment, it starts with a simple case of $N_a$ equal to 0. In this case, the procedure returns true with A(X) set to Ø. If $N_a>0$, the behavior of the procedure depends on whether there is no selected aggregate Y covering X, i.e., Y is Ø or there is a selected aggregate Y covering X, i.e., Y≠Ø. Let us focus on the first case here. For this case, if X is a leaf of the tree, it represents a subnet address. Therefore, X must be selected as an aggregate to ensure that the subnet is covered. Since the aggregation error resulting from selecting X is zero, the procedure sets A(X) equal to X, and returns true. If X is not a leaf, then it must have two children which are denoted by U and V. At this stage, the procedure considers two options. The first option is to include X in the set of aggregates and try to determine the remaining $N_a-1$ aggregates from the subtrees rooted at the children of X. The other option is to exclude X, and try to determine all $N_a$ aggregates from the subtrees rooted at the children of X. With both the options, the procedure calls itself recursively to select the remaining aggregates from the subtrees rooted at U and V. Procedure FindAgg calls MaxErT(X, $X^F$,K) to determine whether using aggregate X for representing subnets in set $X^F$ satisfies the error bound K or not. Notation $X^F$ here represents all the subnets covered by aggregate X in the subtree, and $X^F-A(U)-A(V)$ represents all the subnets covered by X minus those covered by aggregates in A(U) and A(V). The other case where Y is not Ø is handled in a similar fashion.

Procedure 5 (shown below) presents the illustrative pseudo-code of MaxErT(Y, $Y_s$, K). As disclosed earlier, the procedure returns true if error bound calculated according to Theorem 1 for aggregate Y and subnets in $Y_s$ is less than or equal to error bound K; otherwise, it returns false.

```
Procedure 4 FindAggr (X, Y, N_a, K, A(X))
if Na =0, A(X) ← Ø,, return true
if Na > 0 &&Y = Ø then
    if X is a leaf, A(X) ← X, return true
        if N_a = 1 then
            is MaxErT(X, X^F, K) true? {A(X) ← X, return true}:
            {A(X) ← Ø, return false}
        else if N_a > 1&&X has two children U and V then do not select X
            for m=1, ..., N_a-1 do
                if FindAggr(U, Ø, m, K, A(U)), and
                    FindAggr(V, Ø, N_a-m, K, A(V)) both are true,
                    then A(X) ← A(U) ∪ A(V), return true
            end for
            select X
            for m=0,..., Na-1 do
                X^F = set of subnets covered by X
                if FindAggr(U, X, m, K, A(U)),
                    FindAggr(V, X, N_a-1-m, K, A(V))
                    and MaxErT(X, (X^F-A(U) – A(V)), K) all are true,
                    then A(X) ← X ∪ A(U) ∪ A(V), return true
            end for
            A(X) ← Ø, return false
        end if
    end if
if Na > 0 && Y≠ Ø then
    if X is a leaf A(X) ← X, return true
    if X is not a leaf then
        X has two children U and V
        Do not select X
        for m=0, ..., N_a do
            X^F = set of subnets covered by X
            if FindAggr(U, Y, m, K, A(U)), and
                FindAggr(V, Y, N_a-m, K, A(V)) and
                and MaxErT(Y, (X^F-A(U) – A(V)), K) are true,
                then A(X) ← A(U) ∪ A(V), return true
        end for
        select X
        for m=0,..., Na-1 do
            X^F= set of subnets covered by X
            if FindAggr(U, X, m, K, A(U)),
                FindAggr(V, X, N_a- 1-m, K, A(V))
                and MaxErT(X, X^F-A(U) – A(V), K) all are true,
                then A(X) ← X ∪ A(U) ∪ A(V), return true
        end for
    end if
end if
end for
A(X) ← Ø, return false.
Procedure 5 MaxErT(Y,Y_s,K)
for i = 1, ..., |Y_s| do
    if max_{1≤u,v≤B}|(D_s(R_u, y_i)-F(R_u,Y))-(D_s(R_v,y_i)-F(R_v,Y))| ≥ K then
        return false
    end if
end for
return true
```

Figure 5:
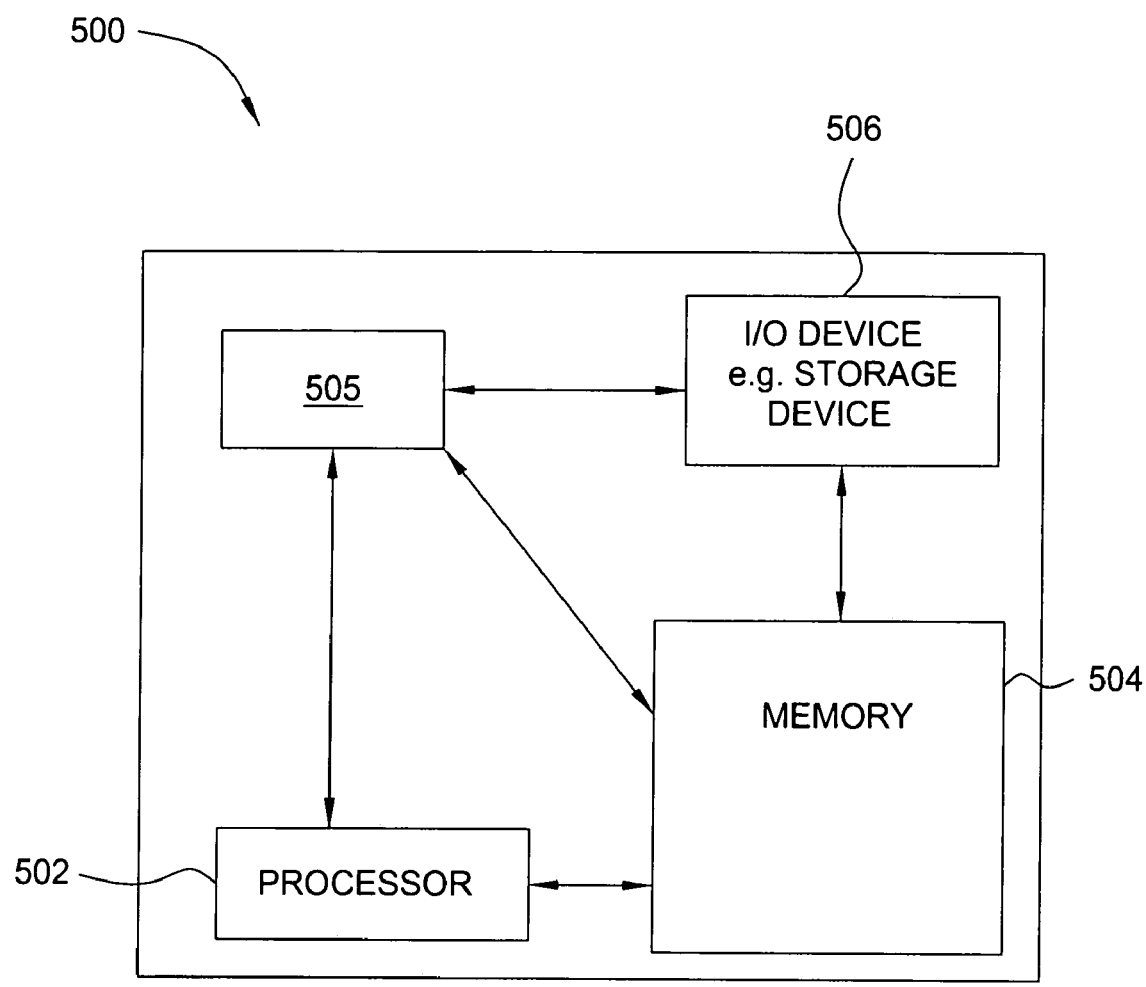
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for generating a set of aggregates, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for generating a set of aggregates can be loaded into memory 504 and executed by processor 502 to implement the functions as discussed above. As such, the present method 505 for generating a set of aggregates (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for generating an aggregate in a communication network, where the communication network comprises a plurality of areas, comprising:
    building an aggregate tree having a plurality of aggregates for an area of the network, where the area comprises a plurality of subnets;
    receiving a path error bound, wherein the path error bound is based on a maximum acceptable path selection error;
    selecting the aggregate from the plurality of aggregates subject to the path error bound, wherein the selecting is performed via a processor; and
    advertising the aggregate to a router of the communication network.

2. The method of claim 1, wherein the communication network is an Internet protocol network.

3. The method of claim 1, wherein the communication network employs an open shortest path first routing protocol.

4. The method of claim 1, wherein the aggregate is an address aggregate.

5. The method of claim 1, wherein the router is a border router.

6. The method of claim 1, wherein the aggregate tree is a binary tree having a plurality of nodes, where each node represents an internet protocol prefix.

7. The method of claim 6, wherein the internet protocol prefix of a parent node covers a plurality of addresses represented by a plurality of prefixes of its children nodes.

8. The method of claim 1, wherein the path error bound is selectively set by an administrator of the communication network.

9. A computer-readable medium having stored thereon a plurality of instructions, the plurality of instructions including instructions which, when executed by a processor, cause the processor to perform a method for generating an aggregate in a communication network, where the communication network comprises a plurality of areas, comprising:
    building an aggregate tree having a plurality of aggregates for an area of the network, where the area comprises a plurality of subnets;
    receiving a path error bound, wherein the path error bound is based on a maximum acceptable path selection error;
    selecting the aggregate from the plurality of aggregates subject to the path error bound; and
    advertising the aggregate to a router of the communication network.

10. The computer-readable medium of claim 9, wherein the communication network is an internet protocol network.

11. The computer-readable medium of claim 9, wherein the communication network employs an open shortest path first routing protocol.

12. The computer-readable medium of claim 9, wherein the aggregate is an address aggregate.

13. The computer-readable medium of claim 9, wherein the router is a border router.

14. The computer-readable medium of claim 9, wherein the aggregate tree is a binary tree having a plurality of nodes, where each node represents an internet protocol prefix.

15. The computer-readable medium of claim 14, wherein the internet protocol prefix of a parent node covers a plurality of addresses represented by a plurality of prefixes of its children nodes.

16. The computer-readable medium of claim 9, wherein the path error bound is selectively set by an administrator of the communication network.

17. An apparatus for generating an aggregate in a communication network, where the communication network comprises a plurality of areas, comprising:

means for building an aggregate tree having a plurality of aggregates for an area of the network, where the area comprises a plurality of subnets;

means for receiving a path error bound, wherein the path error bound is based on a maximum acceptable path selection error;

means for selecting the aggregate from the plurality of aggregates subject to the path error bound; and means for advertising the aggregate to a router of the communication network.

18. The apparatus of claim 17, wherein the communication network employs an open shortest path first routing protocol.

* * * * *